Figure 1:
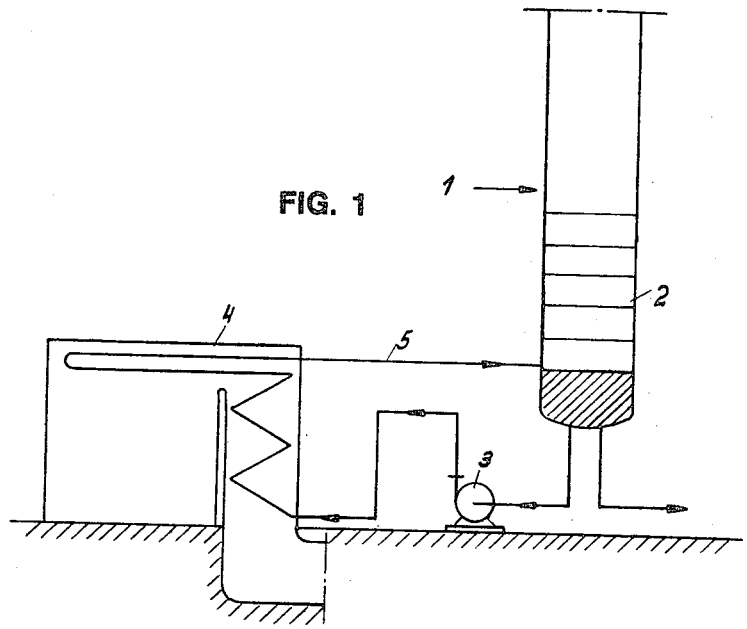

Oct. 9, 1956     H. RATTE ET AL     2,766,190
CONTINUOUS DISTILLATION OF LIGNITE AND COAL TARS
Filed Oct. 24, 1950

Inventor:
Dr. Julius *[signature]*
Dr. Erwin Rath
by Dezsó Steinherz

Attorney

United States Patent Office

2,766,190
Patented Oct. 9, 1956

2,766,190

CONTINUOUS DISTILLATION OF LIGNITE AND COAL TARS

Heinrich Ratte, Frankfurt am Main, and Julius Geller, Bad Homburg von der Höhe, Germany, assignors to Rütgerswerke-Aktiengesellschaft, Frankfurt am Main, Germany Application October 24, 1950, Serial No. 191,870
In Germany May 14, 1949
Public Law 619, August 23, 1954
Patent expires May 14, 1969

2 Claims. (Cl. 196—76)

In the known installations for the continuous distillation of tar with tube furnaces the crude tar, from which the water may have been extracted, is after being preheated in heat exchangers heated in the tube furnace up to the maximum distillation temperature at all likely to occur and then conveyed to a middle section of the fractionating column. On entering the column, all constituents of the tar evaporate, except the pitch which passes through the lower part of the column into the sump. The vapours ascending in the column are then fractionally condensed.

In view of the sharpness of separation aimed at by the distillation, this known distillation process is unfavourable, since in the rectification of liquids it is essential, for the sharpness of separation of the residue, that a great part of the distillation heat shall be returned to the column sump.

Attempts have been made to improve the inadequate fractionation in the lower part of the column by adding superheated frothing steam to the residue accumulating in the column sump or to the lower part of the column. Owing to the slightness of the sensible heat which the frothing steam is capable of giving off, however, only a negligible improvement of the sharpness of separation is brought about. For the sharpness of separation of the distillate the known procedure is also inadequate, as it allows only a very limited return flow which is given by the evaporation and superheating of the charge. Even if for simple separation problems only a moderate return flow is required, it is necessary, when employing the known procedure, to heat the charge product far above the boiling point of the distillate, for conveying the requisite heat to the distillation. Owing to the danger of disintegration at high temperature, the tar may, however, before entering the column be heated only up to a certain limit.

Now it has been found, that in the continuous distillation of lignite and coal tar the sharpness of separation can be substantially improved, if the crude tar, from which the water may have been extracted, be conveyed with or without preheating to a middle stage of the distillation column, the distillation heat being supplied to the column by the product collecting in the sump of the column being heated and partially evaporated by indirect heating. The effect of this is, that part of the crude tar which is obtained as distillate, and in part tends to disintegration or polymerisation, is heated only up to the middle column temperature. This temperature, however, lies substantially lower than that temperature which results from indirect heating of the residue in the column sump. There is, of course, a still greater temperature difference as compared with the known method, so that the oil yield in the new method according to the invention is correspondingly greater.

In order to carry out the heating of the product or residue accumulating in the column sump as gently as possible, it has also been found to be of advantage to circulate this product through a heater, for instance a tube furnace. In this way the temperature drop during the heat exchange in the heater is reduced and a detrimental overheating of the tar is avoided.

The proposed method has the further great advantage that the troublesome corrosions in the heater are to a great extent avoided, as these constituents of the tar, which have a particularly corrosive action, namely the accompanying water and the easily boiling fractions, never reach the heater at all.

The separation of the tar by distillation into several fractions can be carried out in a series of main columns or in main columns with a suitable number of subsidiary columns. The amount of heat to be supplied to the sump of each column is in many cases relatively small. Now, it has been found to be of advantage to heat more particularly the sump of the subsidiary columns by a portion of the distillation residue which has been heated up in the heater. With this object the subsidiary columns are fitted with a suitable reheater, through which the deflected distillation residue is passed as the heating medium.

The method according to the invention is illustrated in the accompanying drawing, which shows by way of example two constructional forms of an arrangement for carrying out the new method. According to Figure 1 the crude tar, which may have been preheated, is conveyed through the pipe 1 directly to a middle section of the column 2. The product accumulating in the column sump is forced by a pump 3 into the heater 4 and passes in a heated and partially vaporised state through the pipe 5 back to the sump of the column.

Figure 2:
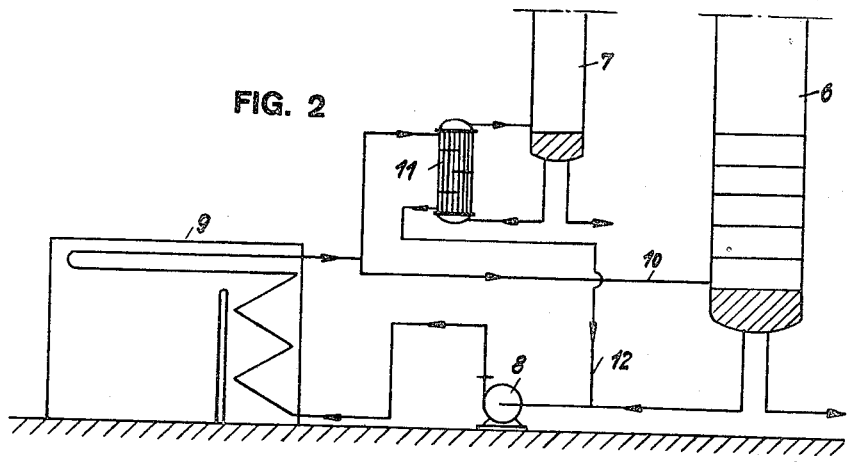

In the constructional form of the arrangement shown in Figure 2, there is provided in addition to the main column 6 a subsidiary column 7. The product accumulating in the sump of the main column 6 is forced by the pump 8 into the heater 9, where it is heated and partially evaporated. Beyond the heater a portion of the heated product is returned through the pipe 10, as shown in Figure 1, to the column sump, whilst another portion passes into the reheater 11 of the subsidiary column 7. Here the heated product yields a portion of its sensible heat and its condensation heat and returns through the pipe 12 into the suction pipe of the pump 8. The quantity of product deflected behind the reheater 11 is so apportioned that the residue accumulating in the sump of the subsidiary column 7 is adequately heated.

We claim:

1. A method of continuously distilling lignite tars and coal tars, comprising separation of the tar into desired fractions in a series of continuously operated main columns and subsidiary columns and supplying heat by indirect heating to the products accumulating in the column sumps, by causing the product accumulating in the sump of a main column to circulate through a first reheater in a first cycle; causing the product accumulating in the sump of a subsidiary column to circulate through a second reheater in a second cycle and heating the second reheater by branching off a reheated portion of the product circulating in said first cycle, causing this portion to pass through the second reheater and return to said first cycle after its discharge from the second heater.

2. A method as claimed in claim 1, in which the liquid circulating in the first cycle is caused to be heated and partially vaporized in the first reheater.

References Cited in the file of this patent

UNITED STATES PATENTS

| 1,911,933 | Courbough | May 30, 1933 |
|---|---|---|
| 2,011,030 | Bergman | Aug. 13, 1935 |
| 2,074,978 | Brandt | Mar. 23, 1937 |
| 2,149,058 | Kraft | Feb. 28, 1939 |
| 2,260,072 | Wilton | Oct. 21, 1941 |
| 2,365,543 | Gerhold | Dec. 19, 1944 |
| 2,366,900 | Weir | Jan. 9, 1945 |